United States Patent
Lagaron Cabello et al.

(10) Patent No.: US 12,433,852 B2
(45) Date of Patent: Oct. 7, 2025

(54) SELF-ADHESIVE PATCHES MADE OF FIBRES FOR THE CONTROLLED RELEASE OF BIOACTIVES

(71) Applicants: BIOINICIA, S.L., Valencia (ES); CONSEJO SUPERIOR DE INVESTIGACIONES CIENTIFICAS (CSIC), Madrid (ES)

(72) Inventors: Jose Maria Lagaron Cabello, Valencia (ES); Cristina Prieto López, Valencia (ES); María de Las Mercedes Pardo Figuérez, Valencia (ES); Jorge Teno Díaz, Valencia (ES)

(73) Assignees: BIONANOPHARMA S.L., Valencia (ES); CONSEJO SUPERIOR DE INVESTIGACIONES CIENTIFICAS (CSIC), Madrid (ES)

( * ) Notice: Subject to any disclaimer, the term of this patent is extended or adjusted under 35 U.S.C. 154(b) by 172 days.

(21) Appl. No.: 17/924,049

(22) PCT Filed: Apr. 29, 2021

(86) PCT No.: PCT/ES2021/070294
§ 371 (c)(1),
(2) Date: Nov. 8, 2022

(87) PCT Pub. No.: WO2021/229119
PCT Pub. Date: Nov. 18, 2021

(65) Prior Publication Data
US 2023/0270688 A1    Aug. 31, 2023

(30) Foreign Application Priority Data
May 11, 2020    (ES) ................ ES202030423

(51) Int. Cl.
*A61K 9/70*    (2006.01)
*A61F 13/02*    (2006.01)
(Continued)

(52) U.S. Cl.
CPC ........ *A61K 9/7084* (2013.01); *A61F 13/0283* (2013.01); *A61K 8/0233* (2013.01);
(Continued)

(58) Field of Classification Search
CPC .... A61K 9/7084; A61K 8/0233; A61K 8/731; A61K 8/8176; A61K 8/85; A61K 47/32;
(Continued)

(56) References Cited

U.S. PATENT DOCUMENTS

2008/0069863 A1    3/2008    Peters
2013/0261736 A1*   10/2013   Kleiner .............. B29C 48/21
                                                        623/1.38
(Continued)

FOREIGN PATENT DOCUMENTS

EP    1642579 A1    5/2006
EP    2457565 A1    5/2012
(Continued)

*Primary Examiner* — Philip R Wiest
*Assistant Examiner* — Eric Rassavong
(74) *Attorney, Agent, or Firm* — Seed Intellectual Property Law Group LLP

(57) ABSTRACT

The present invention falls within the area of polymeric materials based on ultrafine fibres for use in the pharmaceutical, nutraceutical and cosmetic sector, relating to the method of producing self-adhesive patches and the use thereof as a platform for the controlled release of bioactives by electrohydrodynamic and/or aerohydrodynamic processing techniques.

22 Claims, 5 Drawing Sheets

(51) Int. Cl.

| | |
|---|---|
| *A61K 8/02* | (2006.01) |
| *A61K 8/73* | (2006.01) |
| *A61K 8/81* | (2006.01) |
| *A61K 8/85* | (2006.01) |
| *A61K 47/32* | (2006.01) |
| *A61K 47/34* | (2017.01) |
| *A61K 47/38* | (2006.01) |
| *D01D 5/00* | (2006.01) |
| *D04H 1/425* | (2012.01) |
| *D04H 1/4282* | (2012.01) |
| *D04H 1/435* | (2012.01) |
| *D04H 1/559* | (2012.01) |
| *D04H 1/728* | (2012.01) |

(52) U.S. Cl.
CPC ............ *A61K 8/731* (2013.01); *A61K 8/8176* (2013.01); *A61K 8/85* (2013.01); *A61K 47/32* (2013.01); *A61K 47/34* (2013.01); *A61K 47/38* (2013.01); *D01D 5/0038* (2013.01); *D01D 5/0092* (2013.01); *D04H 1/425* (2013.01); *D04H 1/4282* (2013.01); *D04H 1/435* (2013.01); *D04H 1/559* (2013.01); *D04H 1/728* (2013.01); *A61F 2013/0296* (2013.01); *D10B 2331/04* (2013.01); *D10B 2331/041* (2013.01); *D10B 2509/00* (2013.01)

(58) Field of Classification Search
CPC ...... A61K 47/34; A61K 47/38; A61K 31/192; A61K 31/403; A61K 31/4045; A61K 9/70; A61K 9/0014; A61K 9/006; A61F 13/0283; A61F 2013/0296; D01D 5/0038; D01D 5/0092; D01D 5/0007; D04H 1/425; D04H 1/4282; D04H 1/435; D04H 1/559; D04H 1/728; D10B 2331/04; D10B 2331/041; D10B 2509/00; B32B 27/00

See application file for complete search history.

(56) References Cited

U.S. PATENT DOCUMENTS

| | | | |
|---|---|---|---|
| 2013/0281944 | A1 | 10/2013 | Drescher et al. |
| 2019/0254986 | A1 | 8/2019 | Hansen |

FOREIGN PATENT DOCUMENTS

| | | | | |
|---|---|---|---|---|
| GB | 2572566 A | 9/2019 | | |
| WO | 2006084909 A1 | 8/2006 | | |
| WO | WO-2012070028 A1 | * 5/2012 | ............... | A61K 9/00 |
| WO | 2015189212 A1 | 12/2015 | | |
| WO | WO-2018033744 A1 | * 2/2018 | ............. | A61K 9/006 |

\* cited by examiner

SELF-ADHESIVE PATCHES MADE OF FIBRES FOR THE CONTROLLED RELEASE OF BIOACTIVES

CROSS-REFERENCE TO RELATED APPLICATIONS AND PRIORITY

This patent application claims priority from PCT Application No. PCT/ES2021/070294 filed Apr. 29, 2021, which claims priority from Spanish Patent Application No. P202030423 filed May 11, 2020.

The present invention falls within the area of polymeric materials based on ultrafine fibres applied to the pharmaceutical, nutraceutical and cosmetic sector, which relates to the method and application thereof in order to manufacture self-adhesive patches as a platform for controlled release of bioactives by means of electrohydrodynamic and/or aerohydrodynamic processing techniques.

BACKGROUND OF THE INVENTION

Pharmaceutical (Active Pharmaceutical Ingredients, APIs), nutraceutical and cosmetic ingredients, also called bioactive compounds, are compounds which include antibiotics, biomolecules such as DNA and RNA, enzymes, liposomes, anti-inflammatory agents, anticarcinogens, probiotics, prebiotics, symbiotics, antioxidants, cellular regenerators, anti-wrinkle agents, etc. Among all the bioactives, the APIs are the most relevant, due to their involvement in health. According to the Biopharmaceutical Classification System (BCS) there are IV classes of APIs, divided into categories according to the high or low permeability or solubility in water thereof. Similarly, these APIs have several routes of administration depending on the solubility thereof and on the formulation of the pharmaceutical form of the drug. There are usually two types of administration routes:

"Direct" routes of administration, wherein the API is administered in the bloodstream itself or the surroundings thereof. Direct routes, or parenteral routes, include the intradermal route, subcutaneous route, intramuscular route, intravascular route, intraperitoneal route, intraosseous route, intraneural route, intrapleural route, among others.

"Indirect" routes of administration, wherein the drug has to cross certain biological obstacles until it reaches the bloodstream. Indirect routes of administration include the oral route, sublingual route, rectal route, respiratory route, dermal route, conjunctival route and genitourinary route.

Of all the aforementioned routes of administration, the most popular manner of administration is the oral route, wherein the API and the excipient thereof are given in tablets, capsules, granulates, tablets, syrups, emulsions, elixirs or suspensions. This is usually a form of administration which is simple, cheap and comfortable for patients as it does not require the intervention of qualified personnel. However, it has many disadvantages and is far from being the most suitable form of administration of certain drugs due to different factors such as the aggressive environment for the API (the acidic pH in the stomach, the enzymes or the interactions with other foods may degrade the active ingredient), the effect of the first step, wherein the bioavailability is reduced (drugs such as aspirin, glycerin trinitrate, lidocaine, metoprolol, morphine, propranolol, salbutamol and verapamil undergo significant hepatic metabolism) and the slow distribution thereof. Solid formulations also have other inconveniences in patients with swallowing difficulties, with vomiting or if they are unconscious, while liquid oral forms may contain increased microbiological contamination due to the addition of preservatives, and there is usually a lower stability of the active ingredient.

One alternative which can prevent using oral administration while maintaining all the advantages is administering the doses via the sublingual and oral routes, since the distribution thereof is more direct, it does not imply a reduction in bioavailability due to the effect of the first step and the hostile environment of the stomach is avoided. It is not an invasive treatment, so it does not cause discomfort or require qualified personnel. Furthermore, this type of treatment can be especially interesting for patients wherein swallowing can be a problem.

The formation of ultrafine fibres prepared by means of the electrospinning process enables the design of self-adhesive patches both for immediate and controlled release for the administration thereof through the mucosa, such as the oral mucosa, the sublingual mucosa, conjunctival mucosa, genitourinary mucosa or even dermally. In the electrospinning technique, the effect of the voltage on the dissolution causes the solvent to evaporate quickly, causing the fibres to form immediately, trapping the API in the fibres. This results in an optimal encapsulation of the API within the fibre structure, as well as a reduction in the ability of the API molecules to crystallise, therefore, maintaining an amorphous or quasi-amorphous state, which facilitates the dissolution, diffusion and adsorption of the API. The micro/nano structure of these materials provides a higher surface/volume ratio and better mechanical properties when compared to other types of techniques for generating patches. Furthermore, these fibrous structures especially facilitate the absorption of APIs with low solubility (Class II and IV), providing greater control over the administration of drugs than with conventional methods.

In relation to the release profile, two different types of patches can be designed:

Immediate release patches, wherein the patch is carefully designed to dissolve in the mouth of the patient without needing to drink or chew, releasing the drugs very quickly in the mucosa for the immediate absorption thereof.

Controlled release patches, wherein the system for administering the drug is required to dissolve within a set period of time, thus enabling the administration of pharmaceutical drugs once or twice per day, improving the treatment of the patient and preventing an increase in dose in the plasma of the patient due to a multiple administration of immediate-release formulations.

Several patented designs of controlled release platforms have been found, such as EP1642579B1, by Ihara et al, and EP1642579 by Tornero-Garcia et al. In the first case, it comprises a patch with laminated layers for controlled release of a single type of API (Fentanyl) for the oral cavity. Although it has certain advantages, this type of patch does not enable the controlled release of any type of API and/or nutraceutical to be covered, as well as the application thereof in other types of body mucosae. Moreover, in the patent EP1642579 by Tornero-Garcia et al, the API is in the pure state thereof entangled between the nanometric fibres making up the patch, but it is not encapsulated in them. This patch also has certain advantages, but it is limited to APIs with low solubility in water. Furthermore, the fact that the API is not encapsulated limits the possible controlled release profiles thereof, as well as possible reaction thereof with external agents.

The present invention aims to solve the difficulties found in the state of the art by presenting a patch which is self-adhesive to the mucosa or skin and the method thereof for obtaining it, being capable of obtaining amorphous or quasi-amorphous solid dispersions or solutions, with the capacity for controlled release of bioactives in fibres by means of electrohydrodynamic and/or aerohydrodynamic processing techniques.

DESCRIPTION OF THE INVENTION

The present invention proposes a methodology and the application thereof in order to generate a multilayer patch with the capacity for controlled release of bioactives, mainly by using electrohydrodynamic and/or aerohydrodynamic processing techniques. The direct access to the plasma without necessarily passing through the gastrointestinal tract allows for, among other aspects, increasing the bioavailability and the effectiveness at lower doses, reducing side effects, facilitating the dosage to the patients and reducing environmental problems of bioactives which are not absorbed in the body. The patch can be manufactured in a monoaxial manner, coaxial manner, by co-deposition or layer-by-layer and it contains one or more bioactives encapsulated therein. Each layer is made up of fibres on a micrometric and/or submicrometric scale. Such patch also has self-adhesive properties to any type of human or animal corporal mucosa, such as the sublingual or conjunctival mucosa, and also to the skin. The bioactive is encapsulated in the present invention by forming what are called solid solutions or dispersions, also referred to as amorphous solid solutions or amorphous solid dispersions, which facilitate the homogeneous and controlled release thereof. The patch of the invention has applications in the areas of pharmaceuticals, nutraceuticals and cosmetics.

The possible structures of the patch of the invention are described below:

Continuously manufactured multilayer, comprising three defined blocks of layers of polymeric fibres. A first block made of one or more layers of hydrophilic fibres which adhere to the mucosa. A second block made of one or more layers of fibres which contains the bioactive made by mixing or by means of emulsion, and a last block made of one or more layers of fibres which act to give resistance to moisture and to help control the release. In this structure, each block is produced on top of the previous block. Additionally, a layer with a low melting point can be included between the blocks described continuously in order to favour the adhesion thereof and/or control the diffusion of the bioactive. This process may or may not lead to an additional step of heat treatment with or without pressure by means of any technique available to this end, with the aim of improving the superficial feel, the interlayer adhesion, increasing the barrier, directing the release or reducing the thickness. Preferably, it will have a hot calendering process at a low temperature in order to prevent the possible degradation of the bioactive.

Multilayer manufactured by laminating, comprising three defined blocks of layers of polymeric fibres. A first block made of one or more layers of hydrophilic fibres which adhere to the mucosa. A second block made of one or more layers of fibres which contains the bioactive made by mixing or by means of emulsion, and a last block made of one or more layers of fibres which act to give resistance to moisture and control the release. In this structure, each block is produced independently from the previous ones and they are joined together by means of a lamination process. The lamination can be done by any industrial lamination method with or without pressure, preferably by low-temperature calendering in order to prevent the possible degradation of the bioactive. Additionally, a layer with a low melting point can be included between the blocks in order to favour the adhesion thereof.

Multilayer manufactured continuously and laminated. This possible structure is the combination of the previous two. In other words, a continuous multilayer patch can be made of several layers separately and then a laminating process can be performed on them in order to favour the joining between the layers, providing a smoother texture, improving the interlayer adhesion, increasing the barrier or directing the release and/or reducing the thickness. Similarly, several layers can be manufactured continuously and be laminated to layers which have been prepared separately. The lamination can be done by any industrial lamination method with or without pressure, preferably by low-temperature calendering in order to prevent the degradation of the bioactive(s).

In a general manner, the patch of the invention is made up of three differentiated blocks of layers, as represented in the diagram of FIG. 1.

The first block (A) is in contact with the mucosa or skin and it is made with hydrophilic components and has self-adhesive properties. The block (B) contains the bioactive(s), while the third block (C) acts as a barrier, in other words, it enables the release in a controlled manner to the outside or it blocks the release of the bioactive(s) in the direction opposite from the mucosa or skin, at the same time that it protects the patch from moisture. Each block can be made up of one or more different layers of micro or submicrofibres.

Therefore, a first aspect of the present invention relates to a self-adhesive patch as a platform for controlled release of bioactives comprising at least:

a. A first block A which is in contact with the corporal mucosa or skin to which it adheres and which is characterised in that it has at least one layer of fibres made of one or more hydrophilic polymers. By being made of very fine fibres, the large surface-to-volume ratio of these fibres generates a local dissolution and a strong adhesion without needing to add other adhesive substances. The layers of this block or the block as a whole must have a surface density of at least $0.2$ $g/m^2$, more preferably between 1 and 10,000 $g/m^2$, and even more preferably between 10 and 500 $g/m^2$;

b. A second block B deposited on the block A, containing the encapsulated bioactive(s), characterised in that it is formed by at least one layer of fibres made of one or more hydrophilic polymers, hydrophobic polymers, or a mixture of both, and in that it contains the encapsulated bioactive(s). The layers of this block or the block as a whole must have a surface density of at least 0.2 $g/m^2$; more preferably between 1 and 30,000 $g/m^2$; and even more preferably between 10 and 500 $g/m^2$;

c. A third block C deposited on the block B and formed by at least one layer of fibres made of one or more hydrophobic polymers. The layers of this block or the block as a whole must have a surface density of at least 0.2 $g/m^2$; more preferably between 1 and 30,000 $g/m^2$; and even more preferably between 10 and 500 $g/m^2$.

In the present invention, the surface density, typically expressed in $g/m^2$ for each of the layers, is calculated by weighing a sample with known dimensions. Next, this weight is then divided by the surface of the sample. This process is carried out with at least 5 samples of each layer in order to thus obtain a mean surface density value for the entire layer.

In the present invention, the term "encapsulation" relates to the incorporation of the bioactive both inside the fibres of the polymers that make up each of the layers of the patch, forming a separate core-shell phase, and also refers to constituting a physical mixture with the polymeric material of the fibre, including what are known as amorphous solid solutions or amorphous solid dispersions; the bioactive can therefore be found both inside and on the surface of said fibres, or even in the interstitial spaces between the same.

In the present invention, the term "controlled release" relates to the capacity of the material, either by total or partial diffusion or dissolution, to release the bioactive in a controlled manner from the patch to the mucosa or skin and/or to the outside. Controlled release includes without limitation releases which are immediate, modified, delayed, slow, sustained and extended.

In a preferred embodiment, the release of the bioactive is extended and occurs by diffusion, without dissolution of the fibres, with a release profile at constant speed.

In another preferred embodiment the release of the bioactive is extended multimodal and takes place by diffusion, without dissolution of the fibres, with a release profile at different rates.

In another preferred embodiment, the release of the bioactive is a combination of immediate and extended release and it occurs by diffusion, without dissolution of the fibres, with a release profile which initially has a burst release and which afterwards occurs at a constant speed or speeds.

In another preferred embodiment, the hydrophilic polymers are independently polymers permitted for the pharmaceutical, nutraceutical or cosmetic application, being water-soluble, alcohols and/or a mixture thereof, and which are selected without limitation from among polyethylene oxide (PEO) and derivatives thereof such as non-ionic water-soluble resins (Polyox WSR), polyvinylpyrrolidone (PVP) and the copolymers thereof, polyvinyl alcohols (PVOH) and the copolymers thereof with ethylene (EVOH), polyacrylates (PAC), polyacrylic acid (PAA), water-soluble polyacronitriles (PAN), lignin and derivatives such as sulphonated lignin (LS), acrylic/methacrylic ester polymers, polysaccharides and derivatives, such as pullulan, hyaluronic acid, alginate, tragacanth, carrageenan, chitin and derivatives such as chitosan, celluloses such as ethylcellulose, hydroxypropyl cellulose methylcellulose, hydroxypropyl methylcellulose, gluocogen, starch and polymers derived from it such as thermoplastic starch (TPS), pectin, guar gum, xanthan gum, fructosan or gellan gum among others, proteins and derivatives, such as collagen, gelatin, soy protein, whey protein, zein, gluten, casein, or lectins among others, thiolated polymers, polyanhydrides, and PAA polyethylene glycol copolymers (PAA-co-PEG), as well as mixtures of any of the above, or any of the above mixed with additives such as plasticisers, surfactants, antioxidants, dyes, etc.

In another more preferred embodiment, the hydrophilic polymers are independently selected from PVP, PEO, PVOH, polyacrylates, zeins, gluten derivatives, cellulosic materials, or combinations thereof.

In an even more preferred embodiment, the hydrophilic polymers of the block A form an emulsified mixture of PEO and PVP, which optionally contains acrylates, zein, gluten derivatives, ethyl cellulose, or a mixture thereof.

In an even more preferred embodiment, the hydrophilic polymer which forms the block A is PEO which optionally contains acrylates, zein, gluten derivatives, ethylcellulose, or a mixture thereof.

In another preferred embodiment, the hydrophobic polymers are polymers soluble in organic solvents permitted for the pharmaceutical, nutraceutical or cosmetic application, which are selected without limitation from non-water-soluble proteins such as keratin, waxes or paraffin, polyhydroxyalkanoates (PHA) such as PHB, PHV, medium-chain-length polyhydroxyalkanoates (mcl-PHA), and all the possible copolymers thereof such as PHBV among others, polylactic acid (PLA) and all the copolymers thereof such as PGLA, poly-ε-caprolactone (PCL) and all the copolymers thereof such as PEG-PCL and PCLA, polyphosphazenes, polyorthoesters, polyesters obtained from natural precursors such as polybutylene succinate (PBS), polytrimethylene terephthalate (PTT), polybutylene terephthalate (PBT), and all possible copolymers thereof such as poly(butylene adipate-co-terephthalate) (PBAT), among others, as well as other non-biodegradable polymers such as: polyolefins of which the ethylene copolymers can be highlighted, such as polyethylene-co-vinyl acetate (EVA), polyurethanes (PURs), polysulphones, polyethylene terephthalate (PET) and copolymers thereof, silicones, polyesters, halogenated polymers such as polyvinylidene fluoride (PVDF) or polyvinylidene chloride (PVDC), polycarbonates, acrylonitrile butadiene styrene, latex, and polyamides such as 6 Nylon 6, Nylon 66 o Nylon 69, as well as mixtures of any of the above, or any of the above mixed with additives such as plasticisers, surfactants, antioxidants, dyes, etc.

In a preferred embodiment, the block B is formed by a combination of hydrophilic and hydrophobic polymers from those mentioned above without limitation.

In a more preferred embodiment, the block B is formed by a hydrophobic polymer or polymers.

In a more preferred embodiment, the block B is formed by at least one hydrophobic polymer which is selected from poly-ε-caprolactone (PCL), poly-ε-caprolactone copolymers, polylactic acid (PLA) and the copolymers thereof, and polyhydroxyalkanoates (PHA), or any of the mixtures thereof. In a more preferred embodiment, the polymer which forms the block B is poly-ε-caprolactone, poly-ε-caprolactone copolymers or any of the mixtures thereof, due to the high biocompatibility and low melting point thereof.

When the polymer which forms the block B is not chemically compatible with the bioactive to be encapsulated or the bioactive has a low or very low solubility in the solvent or solvents of the polymer, then an emulsion pathway can be used to encapsulate the bioactive(s), instead of the direct dissolution of the components.

In another preferred embodiment, the block C is made up of at least one hydrophobic polymer, selected without limitation from poly-ε-caprolactone (PCL), poly-ε-caprolactone copolymers, polylactic acid (PLA) and the copolymers thereof, and polyhydroxyalkanoates (PHA), or any of the mixtures thereof. In an even more preferred embodiment, the polymer which forms the block C is poly-ε-caprolactone, poly-ε-caprolactone copolymers or any of the mixtures thereof. This layer acts to control the release to the outside or as a release barrier for the bioactive, in the latter case so that it is released only towards the direction of the mucosa or skin wherein the patch would be adhered.

In an even more preferred embodiment, the polymer of the layer C is poly-ε-caprolactone (PCL) and the copolymers thereof or any of the mixtures due to the high biocompatibility and low melting point thereof.

In another preferred embodiment, the same bioactive as the content in the block B or another bioactive can be added to the block C, in order to be released towards the outside, in other words, in the direction opposite from the mucosa or skin.

In the present invention, the term "polymer" refers to macromolecular materials both in the pure ex-reactor state, and additive and post-processed materials in commercial formulas typically used by the chemical industries, more commonly called plastic grades. Process additives can be additionally added to any of the polymers or plastic grades, which promote biodegradability or confer stability, another type of additive such as filler, either in micro, submicro or nanometric form in order to improve the physicochemical properties or the capacity for retention and controlled release of the perfume. Such additives can be chemicals, fibres, sheets or particles.

In another preferred embodiment, other components can be added to any of the layers of the block C such as flavours or flavour enhancers, if it is applied in the oral cavity, aromatic substances or flavour enhancers. In this block some type of pigment or printing of a type of logo, pictograph, multi-colour or single-colour, can be added as a differentiating element of the sides of the patch. In this case, the inks or pigments used are not toxic, biocompatible, with good organoleptic properties and do not affect the integrity of the patch or the encapsulated bioactive. To do so, any type of printing or stamping can be used as long as it does not affect the integrity of the patch materials or the encapsulated bioactive.

In another preferred embodiment, between the blocks B and C, one or more layers (B') are incorporated, formed by at least one hydrophilic polymer, with the objective of preventing the diffusion of the bioactive from block B to block C.

In another preferred embodiment, the block A may alternatively be formed by one or more common and/or commercial adhesive materials which are porous or non-porous but permeable to the bioactive and preferably hypoallergenic and which are not necessarily manufactured by electrohydrodynamic or aerohydrodynamic processing techniques. This block can in turn be formed by several peelable or non-peelable layers, having at least one hypoallergenic adhesive on the side in contact with the mucosa. This layer can be a double-sided adhesive, wherein there is a hypoallergenic or not hypoallergenic adhesive in contact with the block B and a hypoallergenic adhesive in contact with the mucosa. Among the adhesives which can be selected without limitation are all those already existing in the industry of adhesives to the mucosa or skin, which are hypoallergenic and even more preferably those which are biocompatible and biodegradable.

From the possible adhesives used the following can be selected, without limitation, among those of synthetic origin such as those based on acrylic polymers, synthetic rubbers, latex-type materials, epoxy systems, silicones, or polyurethanes, and moreover, adhesives of bio-based origin or bio-adhesives which are formed by variations of lipids, proteins and polysaccharides such as fibrin, hydrogels, chitosans, chitins, carraghenates, alginates, etc. This layer can also be formed by combining the mentioned adhesives together and/or with polymer films, without limitation, from the polyolefin family, celluloses, fluoropolymers, and/or polyesters, which can serve as support for the adhesive(s). Alternatively, in the event that the adhesives used require a support material, this can ideally also be biocompatible, biodegradable or oxo-biodegradable, being able to be found among the hydrophilic or hydrophobic polymers mentioned above.

Moreover, the patch of the invention can have any size and shape or flat pattern, made by any conventional cutting method, whether it is manual, using a die-cutting system, or laser cutting.

Regarding the manufacturing of each of the blocks which comprise the patch of the invention, these are preferably carried out by means of any of the known electrohydrodynamic and aerohydrodynamic techniques for obtaining fibres, such as electrospinning, electrohydrodynamic direct writing, melt electrospinning, solution blow spinning, or a combination and/or variant of both. Nevertheless, any other method for obtaining fibres may also be used, such as centrifugal jet spinning or the combination of this and those previously mentioned. The electrohydrodynamic and aerohydrodynamic techniques are based on the formation of polymeric micro or submicrofibres at room temperature or lower, starting from a polymeric solution to which an electric field or gas pressure is applied. The fact that it is used in the form of a solution gives a high versatility, since it enables different substances to be incorporated in the solution itself. At the same time, the fact that the processability thereof is at room temperature prevents certain problems such as the degradation of the bioactive.

In a preferred embodiment, the blocks are formed by means of the electrospinning technique. In an even more preferred embodiment, they are carried out by electrospinning using controlled-outlet, multi-outlet or multi-emitter injectors, whether they have needles or similar or are made of porous materials. The advantage of these injectors over the so-called free surface injectors that do not have the controlled outlet, which are also called needleless electrospinning or free surface electrospinning, is the greater control of the dispersion of fibre diameters and also of the homogeneity along the thickness. The control in the dispersion of the fibre diameter facilitates the reproducibility in the release kinetics and therefore the pharmaceutical certification.

In a preferred embodiment the variation in the fibre diameter is less than 35%, in other words, that the variation of the diameter of the fibre is less than ±17.5% on average.

In another preferred embodiment, the variation in the fibre diameter for a given system with a multi-outlet injector is at least 5% less than that which would be produced with uncontrolled outlet injectors.

In another preferred embodiment, the variation in the fibre diameter for a given system with a multi-outlet injector is at least 15% less than that which would be produced with uncontrolled outlet injectors.

With these techniques and the aforementioned polymers, in the present invention, the bioactive(s) and/or nutraceutical (s) are encapsulated in a such manner that the release is controlled over time. In order to carry out this encapsulation, techniques are used, among which the following are included without limitation: core-shell technology, co-deposition, surface modification electrospinning, side-by-side electrospinning, in order to generate Janus structures, direct mixing, emulsion techniques, pre-encapsulation in particles, or layer-by-layer deposition, etc.

In the present invention, the core-shell technology is used in the case of electrospinning and solution blow spinning, making use of a concentric nozzle through which the bioactive and/or nutraceutical is supplied in solution through the inner tube with or without polymers or polymers only, while the encapsulating agent, in this case, the polymer selected to prepare the corresponding layer, is passed through the outer tube. The use of nozzles with more than two concentric tubes (triaxial or similar) can lead to more bioactive and polymer combinations. In any event, this technology gives rise to tubular fibres inside of which the bioactive and/or nutraceuticals are stored. In this case, using non-water-soluble polymers, the molecules of the bioactive and/or nutraceutical diffuse through the wall of the fibres or through the internal porosity thereof, thus controlling the release process.

In the present invention, the co-deposition consists of a deposition method wherein the two injectors deposit simultaneously, for example, on one hand, the polymeric solution with the bioactive and, on the other, another polymeric solution. This technique is used when the bioactive is not compatible in dissolution with the polymer of interest, or is required to control the release. It is also used by depositing two solutions which contain a different bioactive, or which have different types of polymers, thus generating different sizes and morphologies of fibres within one same membrane, and therefore a different release profile of the bioactive(s). The co-deposition of the bioactive(s) and the fibres of the encapsulant, of particles and/or fibres and/or a mixture of both can therefore be made. Furthermore, simultaneous electrospinning enables the combination of various properties within the same membrane.

In the present invention, the direct mixing can be, without limitation, made of the encapsulated and the encapsulant or of a suspension of particles containing the pre-encapsulated bioactive and the encapsulant, by means of monoaxial electrospinning, giving rise to cylindrical fibres wherein the bioactive is embedded and dispersed inside the fibre. This mixture can be a homogeneous solution or a heterogeneous suspension.

In the present invention, the emulsion techniques relate to any emulsion, without limitation, of solvents or components, which lead to an encapsulation with several phases and which are processed by means of processes known as electrohydrodynamic or aerohydrodynamic processing in emulsion. An emulsion is a dispersion of a liquid (dispersed phase) in the form of tiny drops inside of another liquid (continuous phase) with which it is generally not miscible. The emulsions can be direct, inverse or multiple. Direct emulsions are those wherein the dispersed phase is a lipophilic substance and the continuous phase is hydrophilic. These emulsions are often called L/H or O/W. Inverse emulsions, on the other hand, are those wherein the dispersed phase is a hydrophilic substance and the continuous phase is lipophilic. These emulsions are often referred to by the abbreviation H/L or W/O. They can also be O/O emulsions with two immiscible organic phases. Multiple emulsions are those that, for example, contain an inverse emulsion as a dispersed phase and the continuous phase is an aqueous liquid. Multiple emulsions can be H/L/H or W/O/W or O/W/O. Emulsions can also be formulated as the so-called Pickering emulsions which make use of particles to separate and stabilize the phases and by means of any other type of emulsion technologies. As such, the bioactive is encapsulated within the fibres in the organic phase, and the release is also produced in a controlled manner.

In the present invention, the pre-encapsulation in particles consists of obtaining loaded fibres, or mixed in the case of co-deposition, with micro or nanoparticles in which the bioactive has been previously encapsulated. To do so, any encapsulation method which produces particles is used, such as, and without limitation, electrospray, electrospray assisted by pressurized gas (EAPG), coacervation, emulsion-evaporation/emulsion-extraction, hot melt, interfacial polycondensation, complexing, gelling, fluid bed, atomization, lyophilization, extrusion, electrostatic droplet generation, supercritical fluids, TROMS, etc., and mixtures thereof. These particles with a bioactive and/or a nutraceutical are typically added, in the case of direct mixing, to a solution of the selected polymer, such that, after any of the aforementioned processes, fibres with particles inside them are obtained. In this case, the method of controlled release of the bioactive is performed both by degradation of the particles and the fibres, and by diffusion through the particles and the fibre, or it may even be the case that the two release mechanisms occur simultaneously.

In the present invention, the layer-by-layer deposition method consists of the use of a system wherein the layers are deposited sequentially within the same process. In this manner, initially one of the layers is electrospun until the desired thickness is obtained and then the second layer is electrospun on top of the first layer, obtaining a multilayer system in situ.

Therefore, a second aspect of the invention refers to obtaining a patch which releases a bioactive in a controlled manner, comprising the following steps:

a) Preparation of the block A starting from a solution of hydrophilic polymer or polymers at a concentration between 0.01 and 98% by weight, wherein the voltage of the emitter used is between 0.01 and 500 kV and a voltage in the collector between 0 kV and −500 kV, with a flow rate between 0.0001 to 1,000,000 ml/h, at a temperature between 1° C. and 100° C. and a relative humidity between 0% and 100%;

b) Preparation of the block B starting from a solution of the hydrophilic and/or hydrophobic polymer or polymers at a concentration between 0.01 and 98% by weight, and one or more bioactives in a concentration between 0 and 98% by weight, wherein the voltage of the emitter used is between 0.01 kV and 500 kV and the voltage in the collector between 0 kV and −500 kV, with a flow rate between 0.0001 to 1,000,000 ml/h at a temperature between 1° C. and 100° C. and a relative humidity between 0% and 100%;

c) Preparation of the block C starting from a solution of the hydrophobic polymer or polymers at a concentration between 0.01 and 98% by weight, and optionally one or more bioactives in a concentration between 0 and 98% by weight, wherein the voltage of the emitter used is between 0.01 kV and 500 kV and the voltage in the collector between 0.01 kV and −500 kV, with a flow rate between 0.0001 to 1,000,000 ml/h at a temperature between 1° C. and 100° C. and a relative humidity between 0% and 100%;

d) Processing of the blocks is produced either continuously or separately in steps (a), (b), and (c) by means of lamination.

As discussed above, the multilayer patches can be manufactured continuously by depositing each layer on top of the previous one, or manufactured separately by joining them by means of any lamination method, or a combination of both. Regarding the lamination, this can be done by any lamination method with or without pressure, preferably by low-temperature calendering.

Calendering can be performed by using two or more rollers with or without pressure, wherein at least one of them can be at the required temperature, or it may be the case wherein all the rollers are at the desired temperature. In this step, the rollers can have a certain shape on the surface thereof, such that it can generate a texture and shape for the patches.

The calendering of the produced layers can be performed such that the first layer of the block A is in contact with the heating roller, or, on the contrary, it can be the last layer of the block C which is in contact with the roller which is at the required temperature.

In an even more preferred embodiment, the calendering of the produced layers will be carried out such that it is the last layer of the block C which is in contact with the roller which is at the required temperature, in order to close the pores between fibres and thus prevent the release of the bioactive to the outside.

In a preferred embodiment the calendering or similar process is performed at a speed range between 0.001 to 100,000 rpm and at a temperature range between 0 and 500° C.

In another preferred embodiment, the temperature of the calender roller(s) will be less than 100° C., and even more preferably less than 60° C.

In another preferred embodiment, the different layers can be manufactured separately and then a heat treatment process with or without pressure can be performed, preferably by low-temperature calendering, in order to ensure adhesion between layers, to give the patch a smoother texture, and to be able to reduce the thickness.

In another preferred embodiment, the incorporated bioactive is selected without limitation from living or dead microorganisms beneficial to health, generally called probiotics, symbiotics, proteins, minerals, fish or algae oils such as, without limitation, omega 3 and 6, antioxidants and/or anti-inflammatories such as terpenoids (carotenoids, and sterols), phenolic compounds (flavonoids such as phyto-oestrogens or quercetin, the most common flavonoid in the diet), sulphur compounds and mixtures of all of the above.

Terpenoids include but are not limited to: Carotenoids, Lycopene, β-cryptoxanthin, Lutein and zeaxanthin, Phytosterols. Among phenolic compounds the following are included: Simple phenolic acids and alcohols, polyphenols such as quercetin, camphor, myricetin and anthocyanidins, Catechins and proanthocyanidins, Hesperidina, naringenin, Apigenin, luteolin, Resveratrol, Phyto-oestrogens such as isoflavones (genistein, daidzein) and lignans. Likewise, among sulphur compounds the following are included: Allicin, diallyl sulphide, Isothiocyanate, sulphoraphane, and the derivatives thereof.

In another preferred embodiment, the incorporated bioactive is selected from the compounds which are anticarcinogenic, antimicrobial, antioxidants, antithrombotic, immunomodulators, anti-inflammatory, antihypertensive, cholesterol-lowering, and other beneficial compounds for the digestive system.

In another even more preferred embodiment, the bioactive (s) incorporated in the block B and/or C of the patch of the invention are selected without limitation from among antioxidants such as vitamin C, vitamin E, resveratrol, terpenoids such as carotenoids and sterols, phenolic compounds such as flavonoids (quercetin, the most common flavonoid in the diet), and natural or synthetic antioxidant concentrates or isolates, biological organisms such as cells of value to biomedicine and probiotics (such as *Lactobacillus* and *Bifidobacterium*), other microorganisms such as Cyanobacterium, Rhodobacterals and *Saccharomyces*, probiotics (lactulose, galacto-oligosaccharides, fructo-oligosaccharides, malto-oligosaccharides, xylo-oligosaccharides, functional oligosaccharides (oleic acid), polyunsaturated fatty acids (omega-3 and omega-6) and other marine oils, phytosterols, phyto-oestrogens, protein ingredients (AON and the derivatives thereof, lactoferrin, ovotransferrin, lactoperoxidase, lysozyme, soy protein, immunoglobulins, bioactive peptides), as well as the possible combinations thereof.

In another preferred embodiment, the bioactive(s) incorporated in the block B and/or C of the patch of the invention are selected from among class I active pharmaceutical ingredients (APIs), Class II APIs, Class III APIs and Class IV APIs according to the BCS (Biopharmaceutical Classification System).

In another more preferred embodiment the API(s) are selected from class II, III and IV APIs, since their low solubility, permeability, or both prevent the bioavailability thereof.

In another more preferred embodiment, the APIs are selected without limitation from among the following families according to the pharmacological activity thereof:

Bioactives with anti-inflammatory capacity (Ibuprofen, Naproxen, Ketoprofen, Diosmin, Ferulic Acid, Diclofenac, Indometachin, Dexketoprofen, Piroxicam).

Bioactives with antimicrobial capacity, among which are antibiotics, antivirals, antifungicides and antiparasites such as Griseofulvin, Indomethacin, Ciprofloxacin, Glycerol monolaurate, Cefoxitin, Hydrochlorinated tetracycline, Amoxicillin, Acyclovir, Levofloxacin hemihydrate, Moxifloxacin hydrochloride, Itraconazole, Mupirocin, Lidocaine, Ampicillin, Rifampicin, Metronidazole Benzoate, Ganciclovir, Ribavirin, Zidovudine, Tenofovir, Amikacin, Tobramycin, Norfloxacin, Penicillin, Imipenem, Gentamicin, Colistin, Doxycycline, Ceftazidime, Ceftriaxone, Cefaclor, Cloxacillin, Benzylpenicillin, Clindamycin, Sulfadiazine, Clarithromycin, Ribavirin, Amphotericin, Fluconazole, Ketoconazole, Amphotericin, Clotrimazole, among others.

Bioactives with antineoplastic capacity (cisplatin, docetaxel, Paclitaxel, Doxorubicin hydrochloride, Titanocene dichloride, folic acid, Cis-Diamminediiodoplatinum, ferulic acid, Carmustine, Streptozotocin, Cyclophosphamide, Ifosfamide, Carboplatin, Melphalan, Oxaliplatin, Dacarbazine, Procarbazine, Estramustine, Temozolomide, Bleomycin, Epirubicin, Dactinomycin, Mitomycin C, Mitoxantrone).

Bioactive bronchodilators such as adrenaline, Budesonide, Ephedrine, Isoprenaline, Salbutamol, Theophylline, Albuterol, Levalbuterol, Metaproterenol, Terbutaline.

Bioactives for the treatment of diabetes such as insulins, Glibenclamide, Metformin, Repaglinide.

Bioactives used against cardiovascular diseases, whether they are antiarrhythmic, cardiotonic, antianginal, etc. (Valsartan, Nicorandil, Spironolactone, Ephedrine, Phenytoin, Carvedilol, Adenosine, Amiodarone, Amlodipine, Atenolol, Nitroglycerine, Flecainide, Lidocaine, Propafenone, Digoxin, Dobutamine, Dopamine, Milrinone).

Gastrointestinal bioactives (Metoclopramide, Cimetidine), Antihistamines (Diphenhydramine, Loratadine, Chlorpheniramine Maleate), multi-functional hormones (oestrogen, progestin, Levonorgestrel, etc.), Antithrombotic Bioactives: Heparin, Acenocoumarol, Warfarin, Enoxaparin, Nadroparin, Bemiparin, Dalteparin, and certain corticosteroids or muscle relaxants such as Altracurium, Baclofen, Cisatracurium, Rocuronium, Suxamethonium, Tetrazepam, Botulinum Toxin.

Bioactives used to treat neurological disorders, divided into antipsychotics (Amisulpride, Fluphenazine, Aripiprazole), Antiparkinsonian drugs (biperiden, Levodopa/Carbidopa, Apomorphine Hydrochloride, Ropinirole HCl, Bromocriptine, Rotigotine, Pramipexole dihydrochloride,), Antiepileptic drugs (Carbamazepine, Clonazepam, Phenytoin, Phenobarbital, Gabapentin, Lamotrigine, Oxcarbamezepine, Pregabalin, Topiramate, Valproic Acid), Anxiolytics (Alprazolam, Diazepam, Clorazepate), Antidepressants (Amitriptyline, Citalopram, Clomipramide, Fluvoxamine, Paroxetine, Venlafaxine).

Opioids, commonly used for pain: Ramadol, Hydromorphone, Methadone, Morphine, Oxycodone, Hydrocodone, Oxymorphone, Fentanyl, Tapentadol, Cannabinoids (whether herbal like THC, endogenous and/or synthetic), as well as possible combinations of the aforementioned families. The aforementioned drugs may contain more than one functionality.

In another preferred embodiment, the bioactives are additives used by the cosmetic industry, such as, without limitation, hyaluronic acids, vitamins, aloe vera, liposomes, antioxidants, anti-aging agents, anti-wrinkle agents, cellular regenerants, (e.g. Retinol), etc. In an even more preferred embodiment, the bioactives will not have an organoleptic impact and can be additionally added to block A which is in direct contact with the mucosa or skin.

In the present invention the term "bioactive" refers to, without limitation, any natural or synthetic substance, or any of the mixtures thereof, beneficial for the organism or the skin, and more preferably for use in pharmaceuticals, nutraceuticals and cosmetics.

Lastly, a third aspect of the invention relates to the pharmaceutical, nutraceutical or cosmetic use of the patch of the invention as defined above, and particularly for the use thereof for the controlled release of one or more bioactives.

In a preferred embodiment of the patch of the invention, the layer B controls the release of the bioactive.

In a preferred embodiment of the patch of the invention, the layers B, B' and C control the release of the bioactive.

In a preferred embodiment of the patch of the invention, the layers A, B, B' and C control the release of the bioactive.

Throughout the description and the claims, the word "comprises" and its variants do not intend to exclude other technical features, additives, components or steps. For those skilled in the art, other objects, advantages and features of the invention may be partially deduced from both the description and the embodiment of the invention. The following examples and figures are provided by way of illustration and are not intended to limit the present invention.

EXAMPLES

Next, the invention will be illustrated by means of examples carried out by the inventors, that demonstrate the effectiveness of the product of the invention. To do so for each example, the controlled release in artificial saliva of each drug in the different matrices is indicated, indicating the degree of controlled release of each system.

Example 1: Preparation of the Block B for a Release of Water-Soluble Ropinirole Hydrochloride (API) System in Different Matrices (PCL, PDL20 and PHB) by Monoaxial Electrospinning The matrices used were polyhydroxybutyrate (PHB), poly (D,L-lactic acid) (PDLA) and poly-ε-caprolactone (PCL) containing an encapsulation of Ropinirole hydrochloride in a polymer:API ratio of 80:20. To this end, the starting point was a solution of PHB at 8% by weight (wt %) in 2,2,2-Trifluoroethanol (TFE), a solution of PDLA at 8 wt % in TFE, and a solution of PCL also at 8% by weight (wt %) in TFE. For each polymeric solution, 2% by weight (wt %) of solution was added, in order to maintain a polymer:API ratio of 80:20.

Once both components were dissolved, then the fibre sheet was manufactured by means of the electrospinning technique in a 24-needle linear multi-outlet injector.

In order to produce the PCL fibre mat, a voltage on the emitter of 30 kV was used, as well as a voltage in the collector of −30 kV. A flow rate of 5 ml/h was also used. The fibres were deposited on a rotating collector (200 rpm) covered with a pharmaceutical-grade waxed substrate at a distance of 17 cm. For the case of the PDL20 fibre mat, a voltage on the emitter of 30 kV was used, as well as a voltage in the collector of −10 kV. A flow rate of 5 ml/h was also used. The fibres were also deposited on a rotating collector (200 rpm) covered with a pharmaceutical-grade waxed substrate at a distance of 20 cm. Lastly, in order to produce the PHB fibre mat, a voltage on the emitter of 25 kV was used, as well as a voltage in the collector of −5 kV and a flow rate of 20 ml/h. As in the other cases, the fibres were deposited on a rotating collector (200 rpm) covered with a pharmaceutical-grade waxed substrate at a distance of 25 cm.

For all cases, a temperature of 20° C. and a relative humidity of 35% were used, in Fluidnatek LE-100 equipment from Bioinicia SL, Valencia, Spain.

The quantification of the release of the Ropinirole hydrochloride was performed by means of UV-spectrophotometry at a wavelength of 249 nm, measuring 3 patches of each in a circular shape with a surface area of 2 $cm^2$ for each matrix, in artificial saliva (pH=6.8), under continuous stirring and at 37° C., for 8 h.

Figure 1:
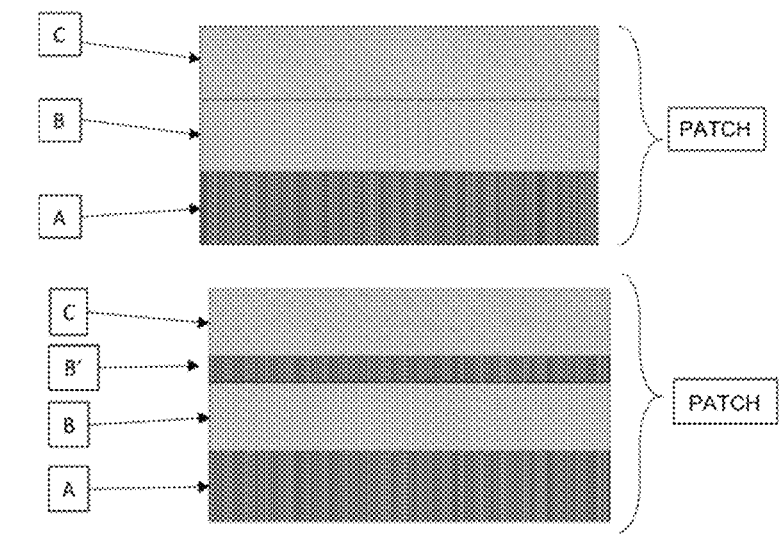
FIG. 1. Typical configuration of the patch according to the multilayer system.
Figure 2:
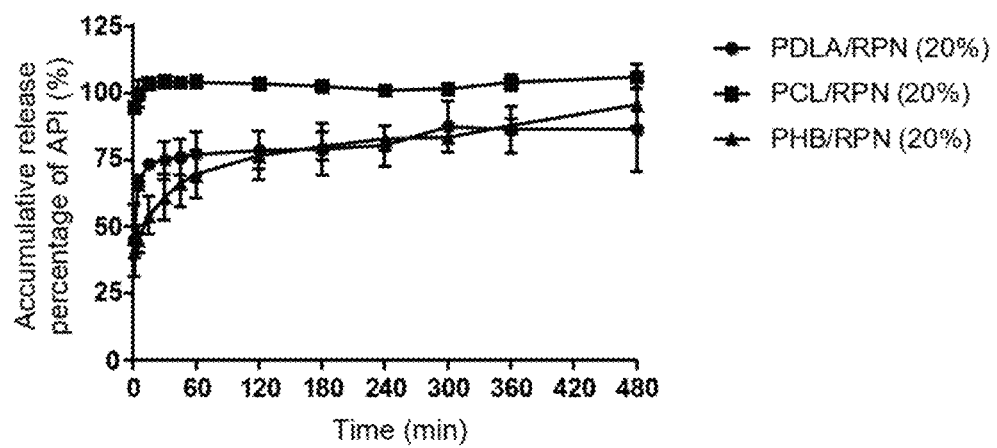
FIG. 2. Release profile of Ropinirole Hydrochloride in three different polymeric matrices.

In this example, the PCL resulted in a fast release and the PHB in a more sustained release (see FIG. 2).

Example 2: Preparation of the Block B for a Sustained Release System of Different Concentrations of Water-Soluble Ropinirole Hydrochloride (API) in a PHB Matrix by Monoaxial Electrospinning The matrix used for this case was polyhydroxybutyrate (PHB). In this example, the same solution and processing conditions were used for this matrix as the ones discussed in the previous example. In contrast, in this example, a comparison is made based on the concentration of Ropinirole hydrochloride added in the patch. To do so, three solutions were made with different API content, the concentrations being 0.45%, 0.9% and 2% by weight (wt %) of solution, which corresponds to a polymer:API ratio of 95:5, 90:10 and 80:20, respectively. As for the processing conditions for each concentration, they were the same as those set forth in the previous example.

Also, as in the previous example, the measurements by UV-spectrophotometry were performed by measuring 3 patches of each in a circular shape with a surface of 2 cm$^2$ for each matrix, in artificial saliva (pH=6.8), under continuous stirring and at 37° C., for 8 h.

Also, as in the previous example, the quantification of the release of the Ropinirole hydrochloride was performed by means of UV-spectrophotometry at a wavelength of 249 nm, measuring 3 patches of each in a circular shape with a surface area of 2 cm$^2$ for each concentration, in artificial saliva (pH=6.8), under continuous stirring and at 37° C., for 8 h.

Figure 3:
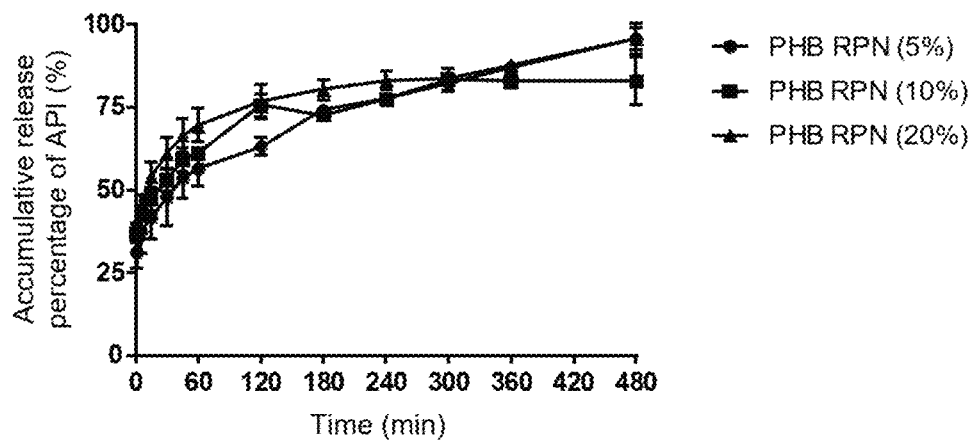
FIG. 3. Release profile of Ropinirole Hydrochloride at different concentrations in the PHB matrix.

In the example it can be seen that lower concentrations of the API lead to a more sustained release profile (see FIG. 3).

Example 3: Preparation of the Block B for a Sustained Release System of Water-Soluble Ropinirole Hydrochloride (API) in Matrices of Mixtures of PHB with PCL by Monoaxial Electrospinning This example shows how the mixture of matrices affects the release of a water-soluble API such as Ropinirole hydrochloride. To do so, three different combinations of poly-ε-caprolactone (PCL) and polyhydroxybutyrate (PHB) have been selected. The combinations studied were the following: 50/50 PCL/PHB, 80/20 PCL/PHB and 20/80 PCL/PHB. In this example, Ropinirole hydrochloride was encapsulated in a polymer:API ratio of 80:20.

To this end, the starting point was a solution of at 4% by weight (wt %) of PCL, 4% by weight (wt %) of PHB in a TFE for the 50/50 PCL/PHB combination. Moreover, for the 80/20 PCL/PHB combination, a solution with the same solvent was used, but with 6.4% by weight (wt %) of PCL and 1.6% by weight (wt %) of PHB. For the 20/80 PCL/PHB combination, the same solvent was also used but with 1.6% by weight (wt %) of PCL and 6.4% by weight (wt %) of PHB. For all combinations, 8% by weight (wt %) of Ropinirole hydrochloride was added, in order to maintain the polymer:API ratio of 80:20.

In order to produce the fibre mats of each combination, a voltage on the emitter of 25 kV was used, as well as a voltage in the collector of −5 kV. A flow rate of 20 ml/h was also used. The fibres were deposited on a rotating collector (200 rpm) covered with a pharmaceutical-grade waxed substrate at a distance of 20 cm in Fluidnatek LE-100 equipment. For all cases, a temperature of 20° C. and a relative humidity of 35% were used.

Also, as in the previous example, the quantification of the release of the Ropinirole hydrochloride was performed by means of UV-spectrophotometry at a wavelength of 249 nm, measuring 3 patches of each in a circular shape with a surface area of 2 cm$^2$ for each mixture, in artificial saliva (pH=6.8), under continuous stirring and at 37° C., for 1 h.

Figure 4:
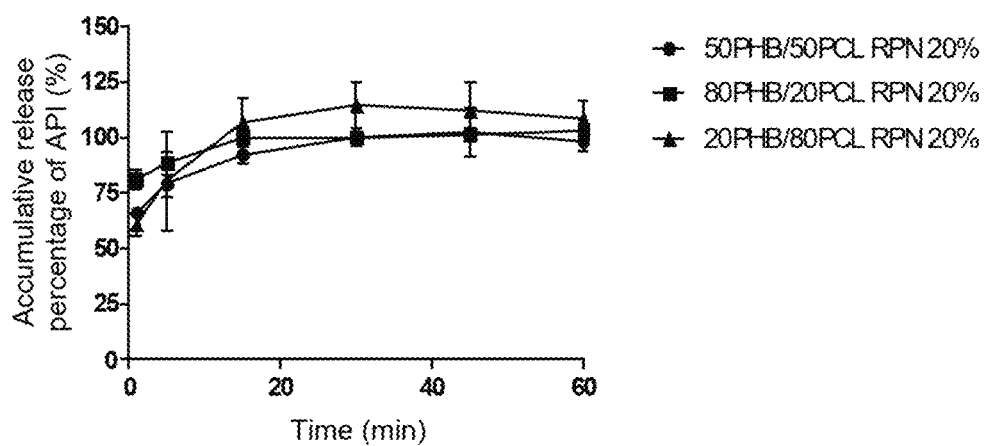
FIG. 4. Release profile of Ropinirole Hydrochloride in three different matrix combinations.

In this example, it is shown that combining materials which lead to a fast release with others that show slow release one can achieve the regulation of the release of the API (see FIG. 4).

Example 4: Preparation of the Block B for a Release System of Water-Insoluble Carvedilol (API) in Different Matrices (PCL, PDLA and PHB) by Monoaxial Electrospinning The matrices used were polyhydroxybutyrate (PHB), poly (D,L-lactic acid) (PDLA) and poly-ε-caprolactone (PCL). In this example, Carvedilol was encapsulated in a polymer:API ratio of 90:10. To this end, the starting point was a solution of PHB at 8% by weight (wt %) of TFE, a solution of PDLA at 8 wt % in an 80:20 Acetone/DMF mixture, and a solution of PCL also at 8% by weight (wt %) in a 70:30 Chloroform: Acetone mixture. For each polymeric solution, 0.9% by weight (wt %) of API was added, in order to maintain a polymer drug ratio of 90:10. Once both components were dissolved, then the fibre sheet was manufactured by means of the electrospinning technique in a linear multi-outlet injector.

In order to produce the PCL fibre mat, a voltage of the emitter of 20 kV was used, as well as a voltage in the collector of −20 kV. A flow rate of 20 ml/h was also used. The fibres were deposited on a rotating collector (200 rpm) coated by a pharmaceutical-grade waxed substrate at a distance of 30 cm. For the case of the PDLA fibre mat, a voltage on the emitter of 20 kV was used, as well as a voltage in the collector of −20 kV, using a flow rate of 15 ml/h. The fibres were also deposited on a rotating collector (200 rpm) coated by a pharmaceutical-grade waxed substrate at a distance of 30 cm. Lastly, in order to produce the PHB fibre mat, a voltage of the emitter of 25 kV was used, as well as a voltage in the collector of −5 kV and flow rate of 20 ml/h. As in the other cases, the fibres were deposited on a rotating collector (200 rpm) covered with a pharmaceutical-grade waxed substrate at a distance of 25 cm.

For all cases, a temperature of 20° C. and a relative humidity of 35% were used, in Fluidnatek LE-100 equipment.

The quantification of the release of the Carvedilol was performed by means of UV-spectrophotometry at a wavelength of 240 nm, measuring 3 patches of each in a circular shape with a surface area of 2 cm$^2$ for each matrix, in artificial saliva (pH=6.8), under continuous stirring and at 37° C., for 8 h.

Figure 5:
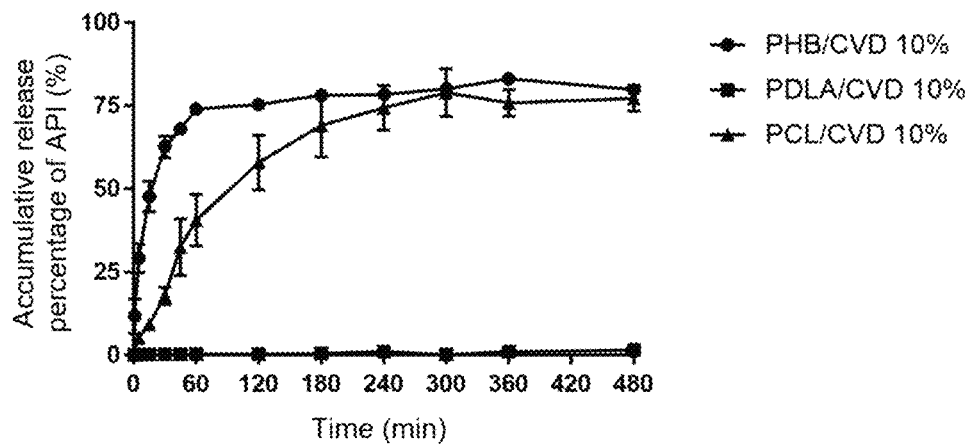
FIG. 5. Release profile of Carvedilol in three different polymeric matrices.

In this example, it is observed how the PDLA leads to a very slow release and PHB to a quicker release (see FIG. 5).

Example 5: Preparation of the Block B for a Sustained Release System of Different Concentrations of Water-Insoluble Carvedilol (API) in a PCL Matrix by Monoaxial Electrospinning The matrix used for this case was poly-ε-caprolactone (PCL). In this example, the same solution and processing conditions were used for this matrix as the ones discussed in the previous example. In contrast, in this example, a comparison is made based on the concentration of Carvedilol added in the patch. To do so, three solutions were made with different API content, the concentrations being 0.45%, 0.9% and 2% by weight (wt %) of solution, which corresponds to a polymer:API ratio of 95:5, 90:10 and 80:20, respectively.

Also, as in the previous example, the quantification of the release of the Carvedilol was performed by means of UV-spectrophotometry at a wavelength of 240 nm, measuring 3 patches of each in a circular shape with a surface area of 2 $cm^2$ for each concentration, in artificial saliva (pH=6.8), under continuous stirring and at 37° C., for 8 h.

Figure 6:
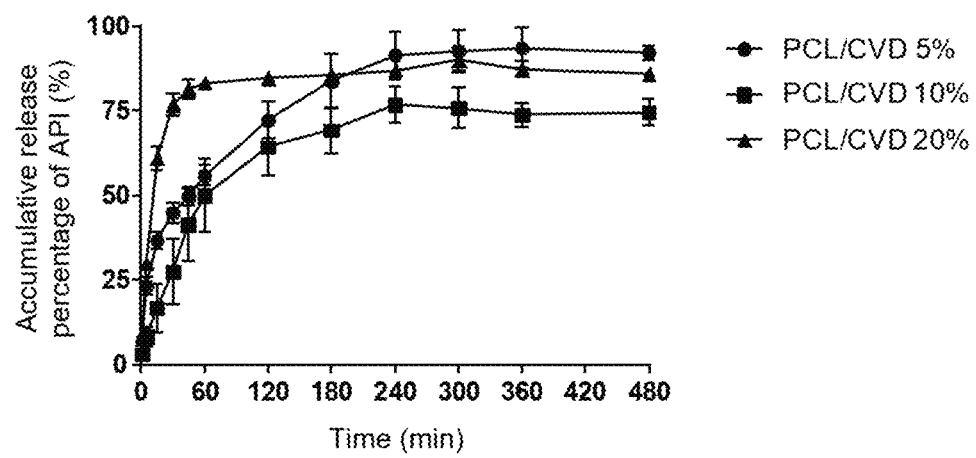
FIG. 6. Release profile of Carvedilol at different concentrations in the PCL matrix.

In this example, it is again observed that lower concentrations of the API lead to a more sustained release (see FIG. 6).

Example 6: Preparation of the Block B for a Sustained Release System of Water-Insoluble Carvedilol (API) in Matrices of Mixtures of PCL with PDLA by Monoaxial Electrospinning This example shows how the mixture of matrices affects the release of an insoluble drug such as Carvedilol. To do so, three different combinations of poly-ε-caprolactone (PCL) and poly(D,L-lactic acid) (PDLA) have been selected. The combinations studied were the following: 50/50 PCL/PDLA, 80/20 PCL/PDLA, and 20/80 PCL/PDLA. In this example, Carvedilol was encapsulated in a polymer:API ratio of 90:10.

To this end, the starting point was a solution of at 4% by weight (wt %) of PCL, 4% by weight (wt %) of PDLA in a 70:30 Chloroform:Acetone mixture for the 50/50 PCL/PDLA combination. Moreover, for the 80/20 PCL/PDLA combination, a solution with the same mixture of solvents was used, but with 6.4% by weight (wt %) of PCL and 1.6% by weight (wt %) of PDLA. For the 20/80 PCL/PDLA combination, the same mixture of solvents was also used but with 1.6% by weight (wt %) of PCL and 6.4% by weight (wt %) of PDLA.

In order to produce the fibre mats of each combination, a voltage on the emitter of 20 kV was used, as well as a voltage in the collector of −5 kV. A flow rate of 20 ml/h was also used. The fibres were deposited on a rotating collector (200 rpm) covered with a pharmaceutical-grade waxed substrate at a distance of 30 cm in Fluidnatek LE-100 equipment. For all cases, a temperature of 20° C. and a relative humidity of 35% were used.

Also, as in the previous example, the quantification of the release of the Carvedilol was performed by means of UV-spectrophotometry at a wavelength of 240 nm, measuring 3 patches of each in a circular shape with a surface area of 2 $cm^2$ for each mixture, in artificial saliva (pH=6.8), under continuous stirring and at 37° C., for 8 h.

Figure 7:
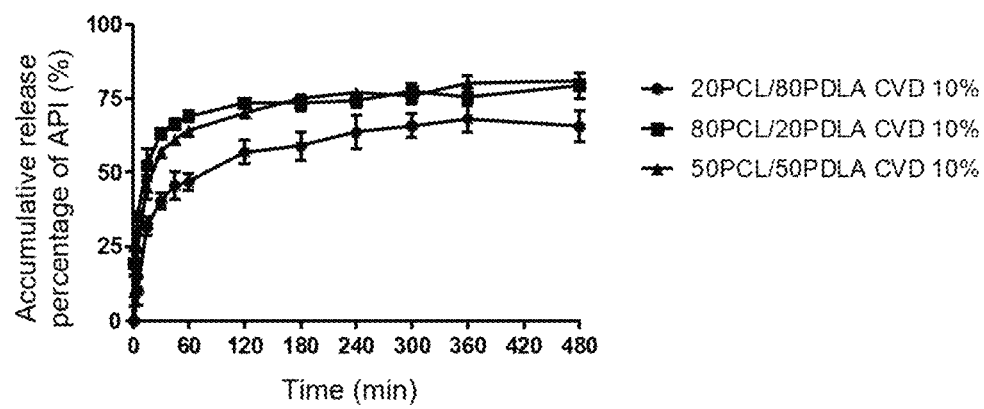
FIG. 7. Release profile of Carvedilol in three different polymeric matrix combinations.

In FIG. 7, it is observed again how the mixture with the highest content of PDLA leads to a slower release.

Example 7: Release System of a Water-Soluble API (Ropinirole) in a Tri-Layer Patch Format. Water-Soluble Inner Layer (Block A) of PEO/PVP/EC, Interlayer of PHB with API and Protective Outer Layer (Block C) of PCL This example shows how the release of a tri-layer patch is.

Preparation of the First Inner Hydrophilic Layer (Block A)

A solution was used of 8% by weight of polyethylene oxide (PEO), 4% by weight of polyvinylpyrrolidone (PVP) and 1% by weight of ethyl cellulose (EC) in a mixture of ethanol/water in a ratio of 5:5. The manufacturing conditions used were a voltage on the emitter of 30V and a voltage in the collector of −20 kV, a flow rate of 26 ml/h was also used, through a multi-outlet linear injector. The fibres were deposited on a rotating collector (200 rpm) coated by a waxed paper substrate and at a distance of 28 cm. Such manufacturing process was performed at a temperature of 25° C. and a relative humidity of 30%. In this case, the surface density is 20 $g/m^2$.

Preparation of the Second Hydrophobic Layer with Encapsulated API (Block B)

This layer was made following the conditions of example 1 for PHB. This layer has a surface density of 10 $g/m^2$.

Preparation of the Third External Hydrophobic Layer (Block C)

A solution is made of Poly-ε-caprolactone (PCL) at 12% by weight, in 79% by weight of Chloroform and 9% Methanol. For the production of this layer on the PVP/Perfume layer, a voltage on the emitter of 23 kV and a voltage in the collector of −1 kV were used, a flow rate of 10 ml/h was also used, through a multi-outlet linear injector. This last layer must have a surface density near 12 $g/m^2$ since the main function thereof is protection and a barrier towards the outlet of the API.

Once each layer has been manufactured independently, they are joined together by the calendering technique at a speed of 2.56 rpm and by heating only the roller which is in contact with the external layer to 40° C. In this manner, the adhesion between layers is ensured and a coalescence of the fibres is performed, reducing the porosity of the external layer of PCL so that the barrier effect is more effective.

Also, as in the previous example, the quantification of the release of the Ropinirole hydrochloride was performed by means of UV-spectrophotometry at a wavelength of 249 nm, measuring 3 patches with a surface area of 2 $cm^2$, in artificial saliva (pH=6.8), under continuous stirring and at 37° C., for 6 h.

Figure 8:
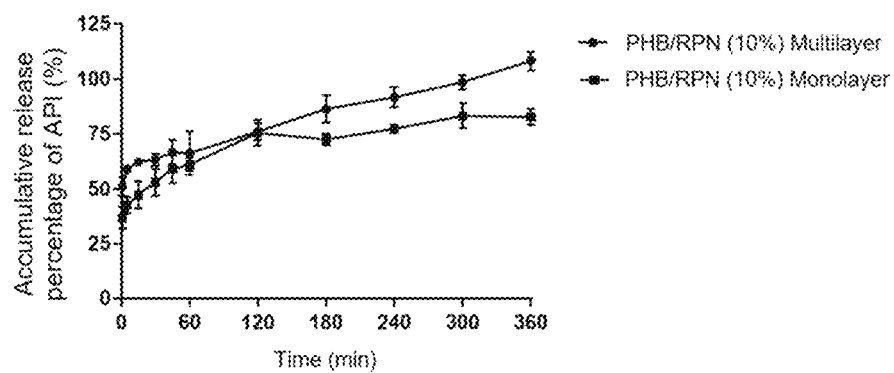
FIG. 8. Comparison of release profile of Ropinirole Hydrochloride in a multilayer patch vs. a monolayer patch.

FIG. 8 shows how the release of the API is regulated in a more sustained manner than in example 1 of the monolayer, reaching a constant release speed.

Example 8: Release System of a Water-Soluble API (Ropinirole) in a Tri-Layer Patch Format. Porous Commercial Adhesive Internal Layer (Block A), Intermediate Layer (Block B) of PHB with API and External Protective Layer (Block C) of PCL This example shows how the release of the sandwich-like tri-layer patch is.

This case is similar to the previous one, but the first layer is based on a 3M commercial double-sided adhesive tape (Ref No. 9917), which is hypoallergenic and especially porous for the contact with the mucosa. The rest of the layers were produced as described in the previous example.

Once each layer has been manufactured independently, they are joined together by the calendering technique at a speed of 2.56 rpm and by heating only the roller which is in contact with the external layer at 40° C. In this manner, the adhesion between layers is ensured and a coalescence of the fibres is performed, reducing the porosity of the external layer of PCL so that the barrier effect is more effective.

Also, as in the previous example, the quantification of the release of the Ropinirole hydrochloride was performed by means of UV-spectrophotometry at a wavelength of 249 nm, measuring 3 patches with a surface area of 2 $cm^2$, in artificial saliva (pH=6.8), under continuous stirring and at 37° C., for 6 h.

Figure 9:
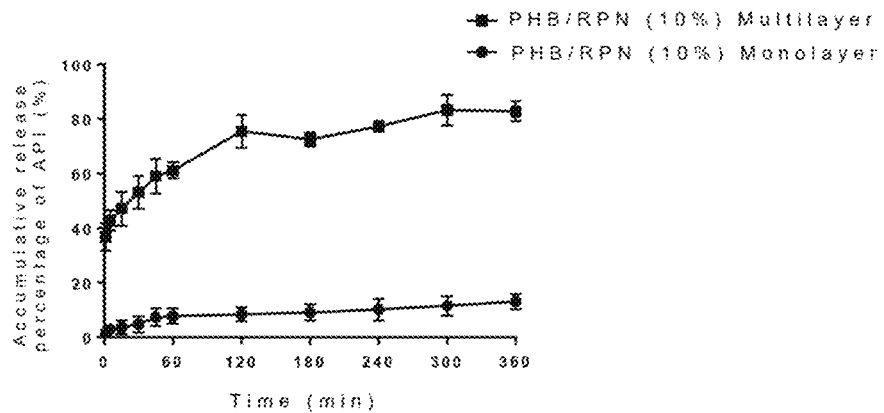
FIG. 9. Comparison of release profile of Ropinirole Hydrochloride in a multilayer patch with a commercial adhesive vs. a monolayer patch.

FIG. 9 shows how the release of the API is regulated in a much more sustained manner than in example 1 witnthe monolayer, showing two constant release rates.

Example 9: Release System of a Water-Insoluble API (Carvedilol) in a Four-Layer Patch Format. Water-Soluble Layer (Block A) of PEO/PVP/EC, Intermediate Layer (Block B) of PHB with API, Protective Layer (B') of PEO/PVP/EC and External Protective Layer (Block C) of PCL This example shows how the release of the sandwich-like four-layer patch is. The first water-soluble layer of PEO/PVP/EC and the last protective layer of PCL were produced under conditions similar to those of example 7.

In this case, the hydrophobic intermediate layer was made following the conditions of example 5 for PHB. This layer has a surface density of 10 g/m$^2$.

Furthermore, a hydrophilic layer was added between the intermediate layer containing the API and the external protective layer. To do so, the same conditions were used as the first hydrophilic layer. The function of this layer is to limit the outlet of the API in the direction opposite from the mucosa or skin.

The quantification of the release of the Carvedilol was performed by means of UV-spectrophotometry at a wavelength of 240 nm, measuring 3 in a circular shape with a surface area of 2 cm$^2$, in artificial saliva (pH=6.8), under continuous stirring and at 37° C., for 6 h.

Figure 10:
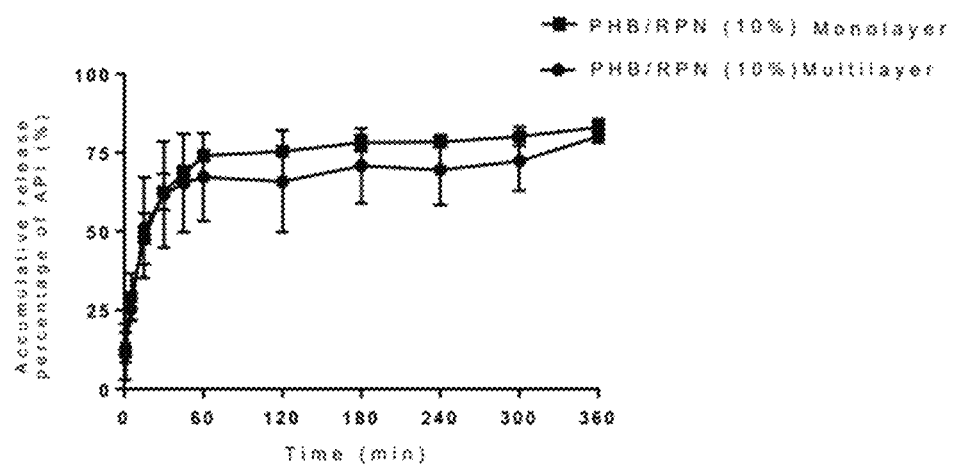
FIG. 10. Comparison of release profile of Carvedilol in the release of the multilayer patch vs. monolayer patch.

FIG. 10 shows how the release of the API is regulated in a more sustained manner than in the monolayer, showing two constant release speeds.

Example 10: Release System of a Water-Insoluble API (Carvedilol) in a Four-Layer Patch Format. Inner Layer (Block A) with Porous Commercial Adhesive, Intermediate Layer (Block B) of PHB with API, Protective Layer (B') of PEO/PVP/EC and External Protective Layer (Block C) of PCL This example shows how the release of a four layer-sandwich-like patch is. This case is similar to the previous one, but the first layer is based on a commercial double-sided adhesive tape, which is hypoallergenic and especially porous for the contact with the mucosa. The rest of the layers were produced as described in the previous example.

The quantification of the release of the Carvedilol was performed by means of UV-spectrophotometry at a wavelength of 240 nm, measuring 3 in a circular shape with a surface area of 2 cm$^2$, in artificial saliva (pH=6.8), under continuous stirring and at 37° C., for 6 h.

Figure 11:
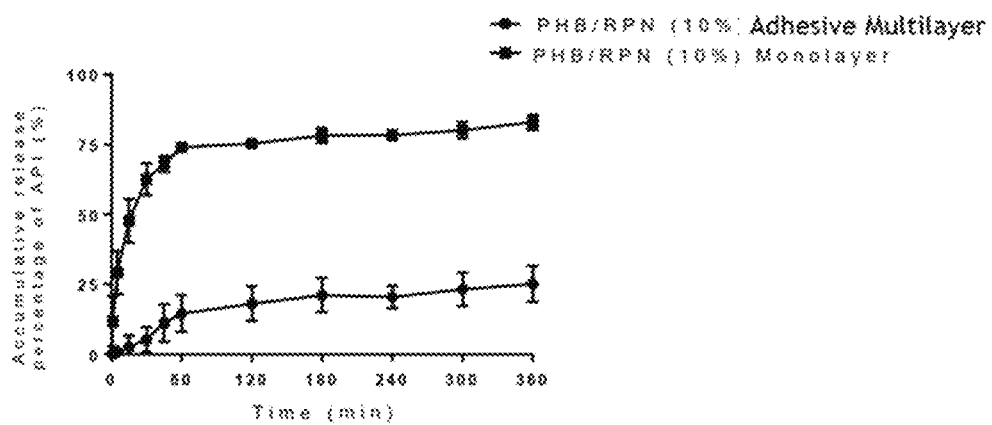
FIG. 11. Comparison of release profile of Carvedilol in a multilayer patch with a commercial adhesive vs. a monolayer patch.

FIG. 11 shows how the release of the API is regulated much more slowly than in the monolayer, with a constant speed from the start.

Example 11: Tri-Layer Release System of a Water-Insoluble API (Carvedilol) Wherein the Intermediate Layer (Block B) is Made by Monoaxial Co-Electrospinning of PCL and PDLA Matrices This example shows how the release of the sandwich-like tri-layer patch is.

The first water-soluble layer (block A) of PEO/PVP/EC and the last protective layer (block C) of PCL were produced under conditions similar to those of example 7.

In this case, for the intermediate layer which contains the API, two different matrices are deposited simultaneously by codeposition. To do so, the starting point is the same solutions mentioned in example 5 for the PCL and PDLA matrices. The processing conditions were also the same as those set forth in example 5. This layer of combination of fibres made of PCL/Carvedilol and PDLA/Carvedilol has a surface density of 20 g/m$^2$. of the use of a roll-to-roll system enables the substrate to pass under both injectors continuously, in other words, depositions of PCL/Carvedilol and PDLA/Carvedilol are performed simultaneously in Fluidnatek LE-500 equipment from Bioinicia S. L. Such manufacturing process was performed at a temperature of 25° C. and a relative humidity of 30%.

Also, as in the previous example, the quantification of the release of the Carvedilol was performed by means of UV-spectrophotometry at a wavelength of 240 nm, measuring 3 patches with a surface area of 2 cm$^2$, in artificial saliva (pH=6.8), under continuous stirring and at 37° C., for 8 h. The results showed a behaviour similar to the 50PCL/50PDLA mixture, but in this case the total release (100%) of the Carvedilol was at 8 h.

Example 12: Release System of a Water-Insoluble Bioactive (Ketoprofen) in a Tri-Layer Patch Format. Water-Soluble Layer (Block A) of PEO/PVP/EC, Intermediate Layer (Block B) of PCL/Gelatin in Emulsion with Bioactive, and Protective External Layer (Block C) of PCL This example shows how the release of the sandwich-like tri-layer patch is.

The first water-soluble layer of PEO/PVP/EC and the last protective layer of PCL were produced under conditions similar to those of example 7.

The PCL/gelatin layer with ketoprofen was manufactured maintaining a bioactive-polymer ratio of 5:95. To this end, the starting point was a solution of PCL at 8% by weight (wt %) in chloroform/methanol in a ratio of 4:1 (vol/vol), with a concentration of ketoprofen of 5% by weight (wt %) in relation to the amount of polymers and a concentration of Span80 of 1% by weight (wt %). A solution of gelatin in acetic acid at 25% by weight (wt %) was also prepared. The concentration of gelatin was 32.5% by weight (wt %). In order to produce the emulsion, the PCL solution was added onto the gelatin solution in a ratio of 3:7 (wt./wt.). The resulting mixture was stirred by an Ultra-Turrax in order to generate the emulsion.

Once the emulsion was prepared, the fibre sheet was manufactured by means of the electrospinning technique. In order to produce the fibre mat, a voltage of 18 kV, a flow rate of 1.1 ml/h and a distance between the injector and the rotating collector (200 rpm) located at 13 cm were used. For all cases, a temperature of 30° C. and a relative humidity of 30% were used.

In order to prevent the gelatin layer from dissolving in the water during release tests, a cross-linking was performed by placing the fibre mat in contact with the gaseous phase of a glutaraldehyde solution in water at 25% for 1 h.

The quantification of the release of the Ketoprofen was performed by means of UV-spectrophotometry at a wavelength of 260 nm, measuring 3 circular patches of each sample with a surface area of 2 cm$^2$, in artificial saliva (pH=6.8), under continuous stirring and at 37° C., for 8 h. The tests demonstrated a sustained release with a diffusion constant of $5.4 \cdot 10^{-15}$ m$^2$/s.

Example 13: Tri-Layer Patch of a Water-Insoluble Bioactive (DHA-Rich Algae Oil). Water-Soluble Layer (Block A) of PEO/PVP/EC, Intermediate Layer (Block B) of Whey Protein with Bioactive, and Protective External Layer (Block C) of PCL This example shows how the release of the sandwich-like tri-layer patch is.

The first water-soluble layer of PEO/PVP/EC and the last protective layer of PCL were produced under conditions similar to those of example 7.

The layer composed of an amorphous solid dispersion of PDLA with DHA-rich algae oil was manufactured maintaining a bioactive-polymer ratio of 33:67. To this end, the starting point was a solution of PDLA at 8 wt % in an 80:20 Acetone/DMF mixture, with a concentration of DHA-rich algae oil of 33% by weight (wt %) in relation to the PDLA. The resulting mixture was thoroughly stirred in order to generate a homogeneous solution.

In order to produce the fibre mat, a voltage of 15 kV, a flow rate of 0.6 ml/h and a distance between the injector and the flat collector located at 12 cm were used. For all cases, a temperature of 30° C. and a relative humidity of 30% were used.

The quantification of the release of the DHA-rich algae oil was performed by means of UV-spectrophotometry at a wavelength of 285 nm, measuring 3 circular patches of each sample with a surface area of 2 cm$^2$, in artificial saliva (pH=6.8), under continuous stirring and at 37° C., for 8 h. The tests demonstrated that the total release was produced in a sustained manner for 6 hours.

Example 14: Continuous Tri-Layer Core-Shell Fibre System of PCL with Soluble API (Ropinirole Hydrochloride)

This example shows how the release of the sandwich-like tri-layer patch is.

The first water-soluble layer (block A) of PEO/PVP/EC and the last protective layer (block C) of PCL were produced under conditions similar to those of example 7.

In this case, the layer which stores the API is produced by means of a device formed by coaxial nozzles. Through the external nozzle (shell), a PCL solution is injected in a 70:30 Chloroform/Methanol mixture at 8% by weight (wt %), using a voltage on the emitter of 20 kV and a voltage in the collector of −10 kV, a flow rate of 10 ml/h was also used. This results in the formation of tubular fibres. Through the internal nozzle (core), a solution of the API at 2% by weight (wt %) in Methanol is injected such that the API is encapsulated in the tubular fibres. The flow rate introduced is 10 ml/h, while obviously the rest of the parameters are the same since it is the same nozzle support. This layer has a surface density of 25 g/m$^2$.

Also, as in the previous example, the quantification of the release of the Ropinirole hydrochloride was performed by means of UV-spectrophotometry at a wavelength of 249 nm, measuring 3 patches with a surface area of 2 cm$^2$, in artificial saliva (pH=6.8), under continuous stirring and at 37° C., for 8 h. In this case, the release process is slower than the one reflected in example 1, in fact, the total release (100%) of the Ropinirole hydrochloride was completed at 8 h.

Example 15: Release System of a Water-Insoluble API (Carvedilol) in a Four-Layer Patch Format by Means of Solution Blow Spinning. Water-Soluble Layer (Block A) of PEO/PVP/EC, Intermediate Layer (Block B) of PHB with API, Protective Layer (B') of PEO/PVP/EC and External Layer (Block C) of PCL. Produced by Solution Blow Spinning This example shows how the release of the sandwich-like four-layer patch is. In this example, it was manufactured by means of the solution blow spinning technique.

Preparation of the First Inner Hydrophilic Layer (Block A)

As in the previous examples, by a first layer of PEO which is the one which adheres to the skin. This is manufactured by using a 10% by weight solution of PEO in a Chloroform/Acetone mixture in a ratio of 8:2 by weight. To do so, a coaxial injector was used, through which the external nozzle (1 mm in diameter) circulates an air flow at a pressure of 0.5 bar, while through the internal nozzle (0.5 mm in diameter) the polymeric solution circulates with a flow rate of 15 ml/h. These fibres are deposited on a rotating collector (120 rpm) located at 20 cm from the nozzle. This layer has a surface density of 50 g/m$^2$.

Preparation of the Second Hydrophobic Layer with API (Block B)

To do so, the starting point is a PCL solution at 8% by weight (wt %) in a Chloroform/Acetone mixture at 70:30. In this polymeric solution, 0.9% by weight (wt %) of Carvedilol was added, in order to maintain a polymer drug ratio of 90:10. For the production of this layer, a pressure of 0.5 bar and a flow rate of 0.25 ml/h were used, through a coaxial injector. This layer was deposited at a distance of 10 cm on the previous layer. This layer must have a surface density of 10 g/m$^2$.

Preparation of the Third Hydrophilic Barrier Layer (B')

This layer is produced in a similar manner to the first hydrophilic layer on the PCL layer with Carvedilol. In contrast, this layer must have a surface area of 30 g/m$^2$.

Preparation of the Last Protective Hydrophobic Layer (Block C)

Lastly, a fourth layer of PCL was deposited. To do so, a solution of PCL at 12% by weight, in 79% by weight of Chloroform and 9% Methanol was used. For the production of this layer on the previous layer, a pressure of 1 bar and a flow rate of 10 ml/h were used, through a coaxial injector. This layer was deposited at a distance of 10 cm. This last layer must have a surface density between 12 g/m$^2$ since the main function thereof is protection and a barrier.

Said manufacturing was performed at a temperature of 25° C. and a relative humidity of 30%, in Fluidnatek LE-100 equipment.

Also, as in the previous example, the quantification of the release of the Carvedilol was performed by means of UV-spectrophotometry at a wavelength of 240 nm, measuring 3 patches with a surface area of 2 cm$^2$, in artificial saliva (pH=6.8), under continuous stirring and at 37° C., taking 8 h to be completely released at a speed close to constant.

Example 16: Four-Layer Continuous System of PCL Fibres Filled with PVP Particles with Encapsulated Water-Insoluble API (Carvedilol)

This example shows how the release of the sandwich-like four-layer patch is, which is similar to the one shown in example 9. But in this case, the hydrophobic layer (block B)

which contains the API is made of PCL fibres filled with PVP particles with Carvedilol.

The starting point is a solution of 1% by weight (wt %) of Carvedilol and 0.25% by weight (wt %) of PVP, in a mixture of Acetone/Water in a ratio of 70:30 by volume. Furthermore, a surfactant such as Span20 was added to it at a concentration of 0.15 by weight. The particles were processed in Capsultek equipment from Bioinicia S. L. at 25° C. and 30% RH, the dissolution at a speed of 1 ml/min with a voltage of 10 kV and a flow of carrier gas of 10 l/min.

These particles are added in a solution of PCL at 15% by weight in a mixture of Chloroform/Methanol in a ratio of 90:10. Starting from this solution, the second layer of fibres is deposited on the first hydrophilic layer, using a voltage of, flow rate of 25 ml/h, at a height of 20 cm. The deposition was performed at a temperature of 25° C. and a relative humidity of 30%. This layer has a surface density of 60 g/m$^2$.

Also, as in the previous example, the quantification of the release of the Carvedilol was performed by means of UV-spectrophotometry at a wavelength of 240 nm, measuring 3 patches with a surface area of 2 cm$^2$, in artificial saliva (pH=6.8), under continuous stirring and at 37° C., for 8 h. The results showed a total release (100%) of Carvedilol at 12 h.

The invention claimed is:

1. A self-adhesive patch as a platform for controlled release of bioactives comprising at least:
   i) a first block A which is in contact with the corporal mucosa or skin to which it adheres characterised in that it is formed by at least one layer made of hydrophilic polymers, and in that it has a surface density of at least 0.2 g/m$^2$, wherein the hydrophilic polymers of the block A form an emulsified mixture of polyethylene oxide and polyvinylpyrrolidone;
   ii) a second block B deposited on the block A obtained by electrohydrodynamic processing, aerodynamic processing or combination of the two, containing the encapsulated bioactive(s), characterised in that it is formed by at least one layer of fibres made of at least one hydrophobic polymer, and in that it has a surface density of at least 0.2 g/m$^2$;
   iii) a third block C deposited on the block B, wherein the block C is formed by at least one layer, characterized in that it is obtained by electrohydrodynamic processing, aerodynamic processing or combination of the two and made up of one or more hydrophobic polymers which are selected from poly-ε-caprolactone, poly-ε-caprolactone copolymers, polylactic acid and the copolymers thereof, and polyhydroxyalkanoates, or any of the mixtures thereof, and in that it has a surface density of at least 0.2 g/m$^2$.

2. The patch according to claim 1, wherein the block B is formed by a combination of hydrophilic and hydrophobic polymers.

3. The patch according to claim 1, wherein the hydrophilic polymers are independently selected from polyethylene oxide and derivatives thereof as non-ionic water-soluble resins, polyvinylpyrrolidone and the copolymers thereof, polyvinyl alcohols and the copolymers thereof with ethylene, polyacrylates, polyacrylic acid, water-soluble polyacronitriles, lignin and derivatives, acrylic and methacrylic ester polymers, polysaccharides and derivatives, hyaluronic acid, pullulan, alginate, tragacanth, carrageenan, chitin and derivatives, celluloses, gluocogen, starch and polymers derived from it, pectin, guar gum, xanthan gum, fructosan, gellan, collagen, gelatin, soy protein, whey protein, zein, gluten, casein, lectins, thiolated polymers, polyanhydrides, and PAA polyethylene glycol copolymers, as well as the mixtures thereof.

4. The patch according to claim 2, wherein the hydrophilic polymers are independently selected from polyvinylpyrrolidone, polyethylene oxide, polyvinyl alcohols, polyacrylates, zeins, gluten derivatives, and cellulosic materials, or combinations thereof.

5. The patch according to claim 1, wherein the hydrophobic polymers are independently selected from non-water-soluble proteins, polyhydroxyalkanoates, medium-chain-length polyhydroxyalkanoates, and all the possible copolymers thereof, poly-ε-caprolactone and all the copolymers thereof, polylactic acid and all the copolymers thereof, polyphosphazenes, polyorthoesters, polyesters obtained from natural precursors, silicones, polyesters, polyurethanes, polysulphones, halogenated polymers, polycarbonates, acrylonitrile butadiene styrene, latex, and polyamides, as well as the mixtures thereof.

6. The patch according to claim 5, wherein the hydrophilic polymer is polyethylene oxide.

7. The patch according to claim 1, wherein block A further contains at least one other polymer which is selected from acrylates, zein, gluten derivatives, ethylcellulose, or a mixture thereof.

8. The patch according to claim 1, wherein block C also contains the same or another bioactive as the one contained in block B.

9. The patch according to claim 1, wherein the block C further contains other components such as flavours or flavour enhancers if it is applied in the oral cavity, or aromatic substances or flavour enhancers.

10. The patch according to claim 1, wherein between the blocks B and C, at least one layer (B') is incorporated which is formed by at least one hydrophilic polymer.

11. The patch according to claim 1, wherein the block A contains at least one adhesive material.

12. The patch according to claim 11, wherein the adhesive material is hypoallergenic.

13. The patch according to claim 12, wherein the adhesive material is porous.

14. The patch according to claim 12, wherein the adhesive material is permeable to the bioactive.

15. The patch according to claim 1, wherein the bioactive is an active pharmaceutical ingredient.

16. A method for obtaining a self-adhesive patch obtained by electrospinning processing as a platform for controlled release of bioactives according to claim 1, comprising the following steps:
   a) Preparation of the block A starting from a solution of the hydrophilic polymer or polymers at a concentration between 0.01 and 98% by weight, wherein the voltage of the emitter used is between 0.01 and 500 kV and a voltage in the collector between 0 kV and −500 kV, with a flow rate between 0.0001 to 1,000,000 ml/h, at a temperature between 1° C. and 100° C. and a relative humidity between 0% and 100%;
   b) Preparation of the block B starting from a solution of the hydrophobic polymer or polymers at a concentration between 0.01 and 98% by weight, and at least one bioactive in a concentration between 0 and 98% by weight, wherein the voltage of the emitter used is between 0.01 kV and 500 kV and the voltage in the collector between 0 kV and −500 kV, with a flow rate between 0.0001 to 1,000,000 ml/h at a temperature between 1° C. and 100° C. and a relative humidity between 0% and 100%;

c) Preparation of the block C starting from a solution of the hydrophobic polymer or polymers at a concentration between 0.01 and 98% by weight, and optionally one or more bioactives in a concentration between 0 and 98% by weight, wherein the voltage of the emitter used is between 0.01 kV and 500 kV and the voltage in the collector between 0.01 kV and −500 kV, with a flow rate between 0.0001 to 1,000,000 ml/h at a temperature between 1° C. and 100° C. and a relative humidity between 0% and 100%;

d) Processing of the blocks produced either continuously or separately in steps (a), (b), and (c), laminated together, wherein the lamination is carried out by low-temperature calendering.

17. The method according to claim 16, wherein the calendering of the layers produced is carried out such that it is the last layer of the block C which is in contact with the roller at low-temperature.

18. The method according to claim 17, wherein controlled-outlet, multi-outlet or multi-emitter injectors are used.

19. The method according to claim 17, wherein the resulting variation in the fibre diameter is less than 35%.

20. The method according to claim 17, wherein the variation in the fibre diameter for a given system with a multi-outlet injector is at least 5% less than that which would be produced with uncontrolled outlet injectors.

21. The method according to claim 17, wherein the variation in the fibre diameter for a given system with a multi-outlet injector is at least 15% less than that which would be produced with uncontrolled outlet injectors.

22. The method according to claim 17, wherein the adhesive material of block A is not manufactured by electrohydrodynamic or aerohydrodynamic processing techniques.

* * * * *